(12) United States Patent
Hickman et al.

(10) Patent No.: US 9,836,483 B1
(45) Date of Patent: Dec. 5, 2017

(54) USING A MOBILE DEVICE FOR COARSE SHAPE MATCHING AGAINST CLOUD-BASED 3D MODEL DATABASE

(71) Applicant: Google Inc., Mountain View, CA (US)

(72) Inventors: Ryan Hickman, Mountain View, CA (US); James J. Kuffner, Jr., Mountain View, CA (US); James R. Bruce, Sunnyvale, CA (US); Anthony G. Francis, Jr., San Jose, CA (US); Arshan Poursohi, Berkeley, CA (US); Chaitanya Gharpure, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 577 days.

(21) Appl. No.: 14/010,642

(22) Filed: Aug. 27, 2013

Related U.S. Application Data

(60) Provisional application No. 61/694,680, filed on Aug. 29, 2012.

(51) Int. Cl.
*G06F 17/30* (2006.01)

(52) U.S. Cl.
CPC .............................. *G06F 17/30277* (2013.01)

(58) Field of Classification Search
CPC ......... G06F 17/30259; G06F 17/30867; G06F 3/0481; G06F 3/04815; G06F 3/0482; G06F 3/0486; G06F 17/30256; G06F 17/30277; G06F 17/30528; G06F 17/30554; G06K 9/00201; G06K 9/00671; G06K 9/00214; G06K 9/00523; G06T 11/60; G06T 17/00; G06T 19/00; G06T 19/20; G06T 2200/04; G06T 2200/08
See application file for complete search history.

(56) References Cited

U.S. PATENT DOCUMENTS 8,606,774 B1 * 12/2013 Makadia ................ G06F 17/30
345/653
2004/0150640 A1 * 8/2004 Park ....................... G06T 17/00
345/419

(Continued)

FOREIGN PATENT DOCUMENTS

WO     WO 2012061945 A1 * 5/2012 ....... G06F 17/30247

OTHER PUBLICATIONS

Autodesk 123D Catch. www.123dapp.com/catch. Jan. 2013.

*Primary Examiner* — Augustine K Obisesan
(74) *Attorney, Agent, or Firm* — McDonnell Boehnen Hulbert & Berghoff LLP

(57) ABSTRACT

Methods and systems for comparing a 3D model of a target object to a shape-search database are provided. An example method includes using a mobile device to acquire a plurality of images of a target object, determining a 3D model based on the images, transmitting a search query that includes the 3D model, and receiving a search query result. In another example method, a server could receive a search query that includes a 3D model of an object, compare the 3D model to a shape-search database, generate a search query result based on the comparison, and transmit the search query result. The search query result could include one or more of: information regarding the target object, information regarding one or more objects similar to the target object, and a suggestion for acquiring additional images of the target object.

20 Claims, 9 Drawing Sheets

(56) References Cited

U.S. PATENT DOCUMENTS

| | | | |
|---|---|---|---|
| 2004/0227751 A1* | 11/2004 | Anders | G06T 7/0018 |
| | | | 345/419 |
| 2004/0249809 A1* | 12/2004 | Ramani | G06F 17/30259 |
| 2006/0012597 A1* | 1/2006 | Chakraborty | G06F 17/30259 |
| | | | 345/419 |
| 2006/0122999 A1* | 6/2006 | Sosnov | G06F 17/30259 |
| 2007/0286531 A1* | 12/2007 | Fu | G06F 17/30277 |
| | | | 382/305 |
| 2009/0112800 A1* | 4/2009 | Athsani | G06F 17/30864 |
| 2009/0138468 A1* | 5/2009 | Kurihara | G06F 17/30256 |
| 2009/0154794 A1* | 6/2009 | Kim | G06T 17/20 |
| | | | 382/154 |
| 2009/0157649 A1* | 6/2009 | Papadakis | G06F 17/30259 |
| 2010/0073499 A1* | 3/2010 | Gere | H04N 5/2254 |
| | | | 348/222.1 |
| 2010/0158355 A1* | 6/2010 | Najafi | G06K 9/3208 |
| | | | 382/154 |
| 2010/0223299 A1* | 9/2010 | Yun, II | G06K 9/00201 |
| | | | 707/803 |
| 2011/0218984 A1* | 9/2011 | Gaash | G06F 17/30241 |
| | | | 707/706 |
| 2011/0286628 A1* | 11/2011 | Goncalves | G06F 17/30256 |
| | | | 382/103 |
| 2012/0105601 A1* | 5/2012 | Jeon | H04N 13/026 |
| | | | 348/50 |
| 2012/0303548 A1* | 11/2012 | Johnson | G06Q 40/04 |
| | | | 705/36 R |
| 2013/0013248 A1* | 1/2013 | Brugler | G06F 11/3082 |
| | | | 702/130 |

\* cited by examiner

USING A MOBILE DEVICE FOR COARSE SHAPE MATCHING AGAINST CLOUD-BASED 3D MODEL DATABASE

CROSS REFERENCE TO RELATED APPLICATION

The present application claims priority to U.S. Provisional patent application Ser. No. 61/694,680, filed on Aug. 29, 2012, and entitled "Using a Mobile Device for Coarse Shape Matching Against Cloud-Based 3D Model Database," which is herein incorporated by reference as if fully set forth in this description.

BACKGROUND

In computer graphics, three-dimensional (3D) modeling involves generation of a representation of a 3D surface of an object. The representation may be referred to as a 3D object data model, or simply a 3D model, and can be rendered or displayed as a two-dimensional image via 3D rendering or displayed as a three-dimensional image. A 3D object data model may represent a 3D object using a collection of points in 3D space, connected by various geometric entities such as triangles, lines, curved surfaces, etc. Various techniques exist for generating 3D object data models utilizing point clouds and geometric shapes.

SUMMARY

In a first aspect, a method is provided. The method includes acquiring, using a mobile device, a plurality of images of a target object and determining a 3D model of the target object based on the images. The 3D model includes three-dimensional shape and color information about the target object. The method further includes transmitting a search query from the mobile device. The search query includes the 3D model. The method additionally includes receiving a search query result at the mobile device.

In a second aspect, a method is provided. The method includes receiving a search query at a server. The search query includes a 3D model of a target object. The 3D model includes three-dimensional shape and color information about the target object obtained from a plurality of images of the target object. The method also includes comparing the 3D model to a shape-search database in a first comparison and generating, at the server, a search query result based on the first comparison. The search query result includes at least one of: i) information regarding the target object; ii) information regarding one or more objects similar to the target object; and iii) a suggestion for acquiring additional images of the target object. The method additionally includes transmitting, from the server, the search query result.

In a third aspect, a mobile device is provided. The mobile device includes a camera and a controller. The camera is configured to acquire a plurality of images of a target object. The controller is configured to determine a 3D model of the target object based on the images. The 3D model includes three-dimensional shape and color information about the target object. The controller is further configured to transmit a search query. The search query includes the 3D model. The controller is also configured to receive a search query result.

In a fourth aspect, a server is provided. The server includes a processor, a non-transitory computer readable medium, and instructions stored in the non-transitory computer readable medium. The instructions are executable by the processor to cause the server to perform functions, the functions including receiving a search query that includes a 3D model of a target object. The 3D model includes three-dimensional shape and color information about the target object obtained from a plurality of images of the target object. The instructions further include comparing the 3D model to a shape-search database in a first comparison and generating a search query result based on the first comparison. The search query result includes at least one of: i) information regarding the target object; ii) information regarding one or more objects similar to the target object; and iii) a suggestion for acquiring additional images of the target object. The instructions also include transmitting the search query result.

In a fifth aspect, a non-transitory computer readable medium is provided. The non-transitory computer readable medium includes instructions executable by a computing device to cause the computing device to perform functions, the functions including determining a 3D model of a target object based on a plurality of images of the target object. The 3D model includes three-dimensional shape and color information about the target object. The functions additionally include transmitting a search query. The search query includes the 3D model. The functions yet further include receiving a search query result.

In a sixth aspect, a non-transitory computer readable medium is provided. The non-transitory computer readable medium includes instructions executable by a computing device to cause the computing device to perform functions, the functions including receiving a search query. The search query includes a 3D model of the target object. The 3D model includes three-dimensional shape and color information about the target object obtained from a plurality of images of the target object. The functions further include comparing the 3D model to a shape-search database in a first comparison. The functions also include generating a search query result based on the first comparison. The search query result includes at least one of: i) information regarding the target object; ii) information regarding one or more objects similar to the target object; and iii) a suggestion for acquiring additional images of the target object. The functions yet further include transmitting the search query result.

DETAILED DESCRIPTION

Figure 1A:
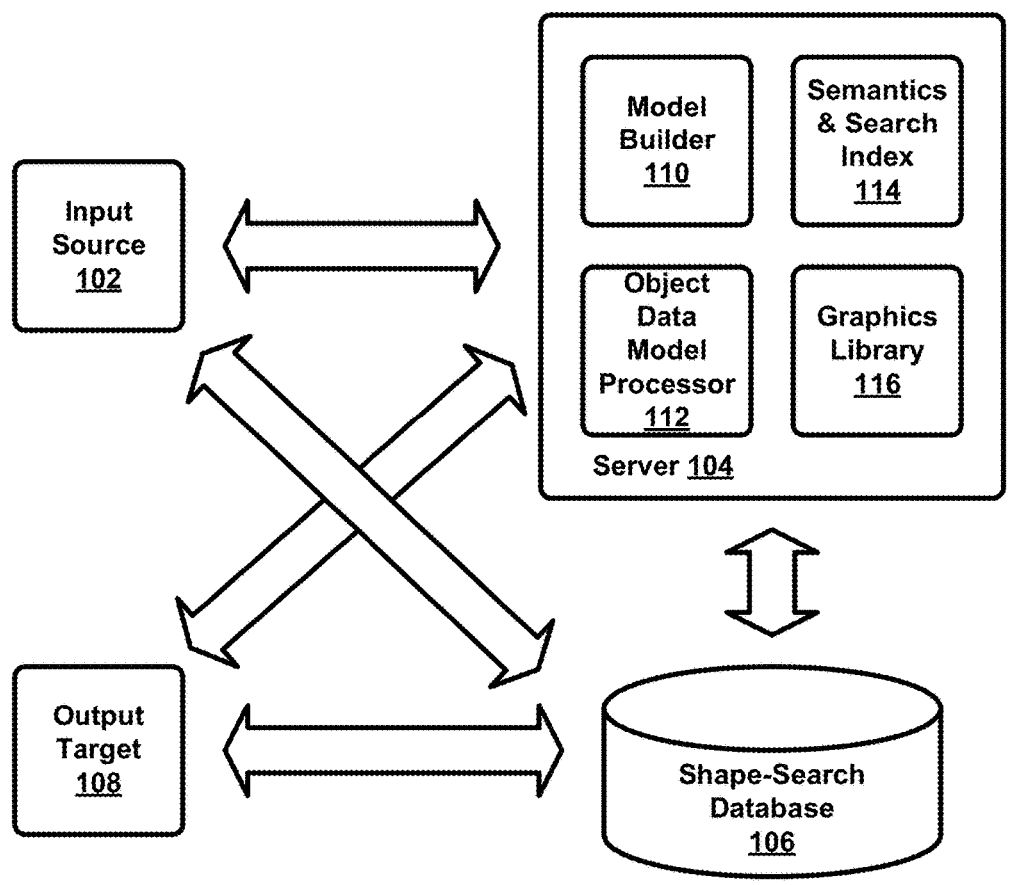
FIG. 1A is a functional block diagram of a system for object data modeling, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

Example embodiments disclosed herein relate to determining, using a mobile device, a 3D model of a target object from a plurality of images of the target object, comparing the 3D model to a shape-search database in a search query, and obtaining a search query result.

Some methods disclosed herein could be carried out in part or in full by a mobile device with or without interaction of a user of the mobile device. In one such example, a mobile device could be used to acquire a plurality of images of a target object. A target object could be any object within a field of view of a camera on the mobile device. Based on the images, a 3D model could be determined. The 3D model could include three-dimensional shape and color information about the target object. In addition to the geometric extents and color of the target object, the three-dimensional shape and color information could include further elements such as lighting information about the target object (e.g., luminance and reflectance of the target object surfaces). In some embodiments, the mobile device may include a display. The display may be capable of displaying a rendered representation of the 3D model. A search query based on the 3D model could be transmitted by the mobile device. The search query could be for a specific purpose (e.g., to search for the price of the target object and locations where the target object may be purchased), or the search query could be generic (e.g., to generally provide more information about the target object). The mobile device could additionally receive a search query result. The search query result could, for example, include a response from a server indicating further information about the target object and/or objects similar to the target object. The search query result may additionally or alternatively include a suggestion for acquiring additional images of the target object.

Other methods disclosed herein could be carried out in part or in full by a server. In an example embodiment, a server may receive a search query that includes a 3D model of a target object (e.g., a search query from a mobile device). The 3D model could be based on a plurality of images of the target object and the 3D model could include three-dimensional shape and color information about the target object. The 3D model could be compared to a shape-search database in a first comparison. The server could generate a search query result based on the first comparison. The search query result could include information regarding the target object, information regarding one or more objects similar to the target object, and/or a suggestion to obtain further images of the target object. The server could transmit the search query result (e.g., to a mobile device).

A mobile device is also described in the present disclosure. The mobile device could include, among other elements, a camera and a controller. The camera could be configured to acquire a plurality of images of a target object. The controller could be configured to determine a 3D model of the target object based on the images. The 3D model could include three-dimensional shape and color information about the target object. The controller could be further configured to transmit a search query based on the 3D model and also receive a search query result. The mobile device could also include a display configured to show a rendered representation of the 3D model.

A server is described that includes a processor, a non-transitory computer readable medium, and instructions stored in the non-transitory computer readable medium. The instructions could be executable by the processor such that the server performs functions similar to those described in the aforementioned method.

Also disclosed herein are non-transitory computer readable media with stored instructions. The instructions could be executable by a computing device to cause the computing device to perform functions similar to those described in the aforementioned methods.

Those skilled in the art will understand that there are many different specific methods and systems that could be used in determining a 3D model of a target object based on a plurality of images of the target object, transmitting/receiving a search query based on the 3D model, comparing the 3D model to a shape-search database, generate a search query result, and transmitting/receiving the search query result. Each of these specific methods and systems are contemplated herein, and several example embodiments are described below.

2. A System for Use in 3D Model/Shape-Search Database Comparison and Search Query Result Creation/Transmission FIG. 1A illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1A.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D model, or object data model, may be received. In some examples, 3D model acquisition (shape and appearance) may be achieved by working with vendors or manufacturers to scan target objects in 3D. For instance, structured light scanners may capture images of a target object and a shape of the target object may be recovered using monochrome stereo cameras and a pattern projector. Various methods for recovering three-dimensional shape and color information from images are known in the art. For instance, Structure From Motion (SFM), stereoscopy, multiscopy, illumination with structured light, and other techniques known in the fields of computer vision and 3D imaging could be used individually or in various combinations to form a 3D model.

In other examples, the input source 102 could include a high-resolution digital single-lens reflex (DSLR) camera that may be used to capture images for color texture information. In still other examples, a raw computer-aided drafting (CAD) set of drawings may be received for each object. In yet another example, a mobile device (e.g., phone, tablet computer, laptop computer, etc.) could acquire a plurality of images of the target object and a 3D model could be determined from the images. Thus, the input source 102 may provide a 3D model, in various forms, to the server 104. As one example, multiple scans of an object may be processed into a merged mesh and assets data model, and provided to the server 104 in that form. As another example, the input source 102 may provide the 3D model within the context of a search query.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry. The model builder 110 could also add information to an existing 3D model to determine a refined 3D model based on, for instance, the shape-search database 106.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. To generate an entire texture map, each image pixel can be associated with a predetermined texture pixel.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may use WebGL or OpenGL mesh compression to reduce a mesh file size, for example. The graphics library 116 may provide the 3D object data model (or 3D model) in a form for display on a browser, for example. In some examples, a 3D object data model viewer may be used to display images of the 3D objects data models. The 3D object data model viewer may be implemented using WebGL within a web browser, or OpenGL, for example.

The shape-search database 106 may store all data sets for a 3D object data model in any number of various forms from raw data captured to processed data for display. Additionally, the shape-search database 106 could act as a shape reference library for a comparison with the 3D model. For example, upon receiving a 3D model from input source 102 in the form of a search query, the 3D model could be compared to the shape-search database 106 in order to obtain information to generate a search query result. The search query result could include information such as objects in the shape-search database 106 that are similar in any combination of shape, texture, color, size, bound volume, luminance, reflectance, and/or any other indexed object attribute.

The shape-search database 106 is communicatively-coupled to server 104, but is not required to be physically or otherwise connected to server 104. Shape-search database 106 could also be integrated into server 104. The shape-search database 106 could be used in conjunction with other elements of system 100 in order to determine if a coarse match exists between a 3D model and objects in the shape-search database 106. In some embodiments, the shape-search database 106 could also be used to determine if refined matches exist between a refined 3D model and objects in the shape-search database 106.

The output target 108 may include a number of different targets, such as a webpage on the Internet, a search engine, a database, etc. The output target 108 may include a 3D object data model viewer that enables product advertisements or product searches based on the 3D object data model. In examples herein, the output source 108 could further include the input source 102. For instance, a mobile device could provide a 3D model in a search query to the system 100 and be considered the input source 102. In such an instance, the system 100 could generate a search query result and transmit the search query result to the mobile device. Thus, the mobile device could also be considered the output target 108. Other output targets 108 are possible. For instance, search query results could be transmitted from the system 100 to different mobile devices.

Figure 1B:
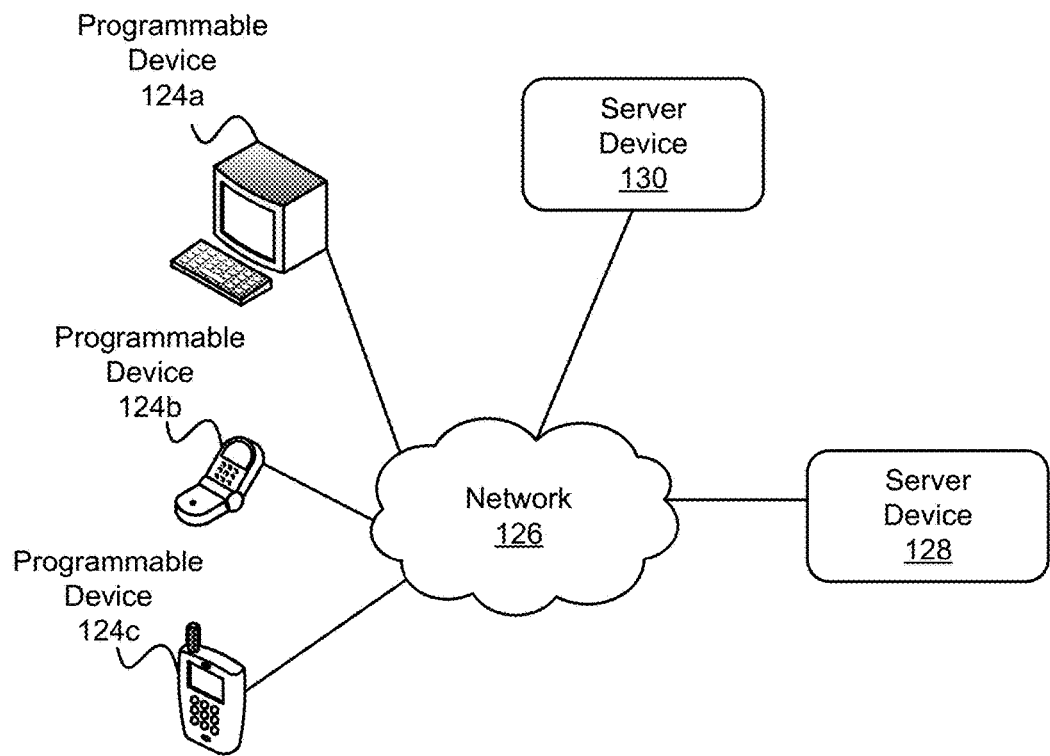
FIG. 1B is a functional block diagram of a distributed computing architecture, in accordance with an example embodiment.
Figure 1C:
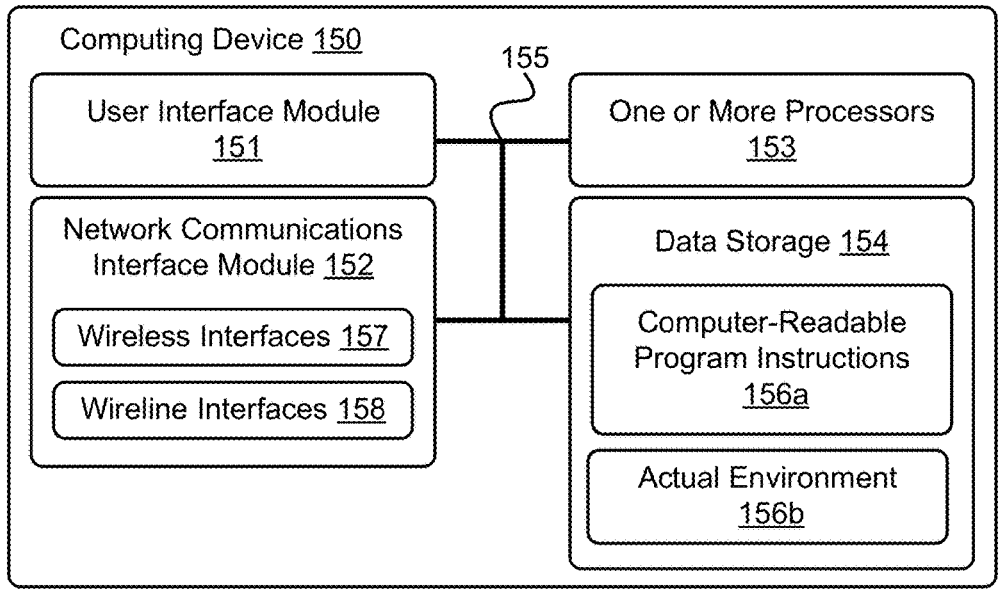
FIG. 1C is a functional block diagram of a computing device in accordance with an example embodiment
Figure 1D:
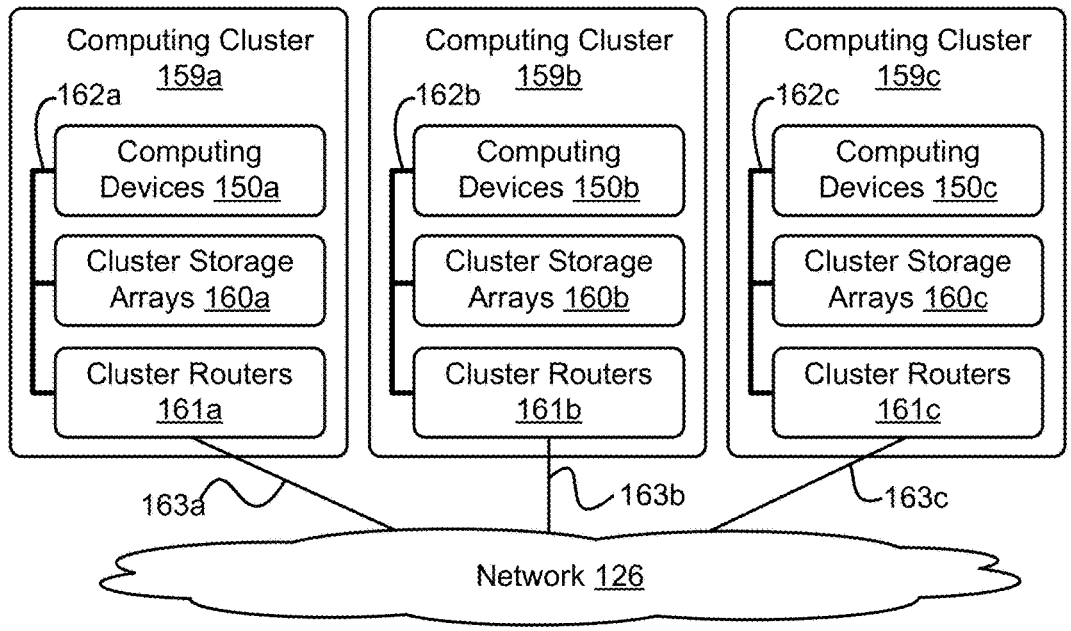
FIG. 1D is a functional block diagram of a cloud-based server system, in accordance with an example embodiment.

FIGS. 1B, 1C, and 1D illustrate an example of a computing device used in a computing system that is arranged in accordance with at least some embodiments described herein. Depending upon the particular embodiment, the computing device may be a personal computer, mobile device, cellular phone, wearable computer, tablet computer, or a server. The computing device may be used to implement systems and method for obtaining a plurality of images of a target object, generating a 3D model based on the images, transmitting/receiving a search query that includes the 3D model, comparing the 3D model to a shape-search database, generating a search query result based on the comparison, and transmitting/receiving the search query result, such as described above and illustrated in FIG. 1A and FIGS. 2-5.

FIG. 1B shows server devices 128, 130 configured to communicate, via network 126, with programmable devices 124a, 124b, and 124c. Network 126 may correspond to a LAN, a wide area network (WAN), a corporate intranet, the public Internet, or any other type of network configured to provide a communications path between networked computing devices. The network 126 may also correspond to a combination of one or more LANs, WANs, corporate intranets, and/or the public Internet.

Server devices 128 and 130 could be similar or identical to server 104 as described in reference to FIG. 1A.

Although FIG. 1B only shows three programmable devices, distributed application architectures may serve tens, hundreds, thousands, or even more programmable devices. Moreover, programmable devices 124a, 124b, and 124c (or any additional programmable devices) may be any sort of computing device, such as an ordinary laptop computer, desktop computer, network terminal, wireless communication device (e.g., a cell phone or smart phone), and so on. In some embodiments, programmable devices 124a, 124b, and 124c may be dedicated to the design and use of software applications. In other embodiments, programmable devices 124a, 124b, and 124c may be general purpose computers that are configured to perform a number of tasks and need not be dedicated to software development tools. Programmable devices 124a, 124b, and 124c could represent one or more input sources 102 or output targets 108 as described in reference to FIG. 1A.

Server devices 128, 130 can be configured to perform one or more services, as requested by programmable devices 124a, 124b, and/or 124c. For example, server device 128 and/or 130 can provide content to programmable devices 124a-124c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 128 and/or 130 can provide programmable devices 124a-124c with access to software for database, search, computation, graphical, audio, video, World Wide Web/Internet utilization, and/or other functions. Many other examples of server devices are possible as well.

FIG. 1C is a block diagram of a computing device in accordance with an example embodiment. In particular, computing device 150 shown in FIG. 1C can be configured to perform one or more functions of server devices 128, 130, network 126, and/or one or more of programmable devices 124a, 124b, and 124c. Computing device 150 may include a user interface module 151, a network-communication interface module 152, one or more processors 153, and data storage 154, all of which may be linked together via a system bus, network, or other connection mechanism 155.

Computing device 150 could also represent one or more of the programmable devices 124a, 124b, and 124c as described in reference to FIG. 1B. Further, computing device 150 could represent an input source 102 or an output target 108 as described in reference to FIG. 1A.

User interface module 151 can be operable to send data to and/or receive data from external user input/output devices. For example, user interface module 151 can be configured to send and/or receive data to and/or from user input devices such as a keyboard, a keypad, a touch screen, a computer mouse, a track ball, a joystick, a camera, a voice recognition module, and/or other similar devices. User interface module 151 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 151 can also be configured to generate audible output(s), such as a speaker, speaker jack, audio output port, audio output device, earphones, and/or other similar devices.

Network-communications interface module 152 can include one or more wireless interfaces 157 and/or one or more wireline interfaces 158 that are configurable to communicate via a network, such as network 126 shown in FIG. 1B. Wireless interfaces 157 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 158 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 152 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 153 can include one or more general purpose processors and/or one or more special purpose processors (e.g., digital signal processors, application specific integrated circuits, etc.). Processors 153 can be configured to execute computer-readable program instructions 156a that are contained in the data storage 154 and/or other instructions as described herein.

Data storage 154 can include one or more computer-readable storage media that can be read and/or accessed by at least one of processors 153. The one or more computer-readable storage media can include volatile and/or non-volatile storage components, such as optical, magnetic, organic or other memory or disc storage, which can be integrated in whole or in part with at least one of processors 153. In some embodiments, data storage 154 can be implemented using a single physical device (e.g., one optical, magnetic, organic or other memory or disc storage unit), while in other embodiments, data storage 154 can be implemented using two or more physical devices.

Data storage 154 can include computer-readable program instructions 156a, actual environment 156b, and perhaps additional data. Actual environment 156b can store at least some of the data used by one or more processes and/or threads of a software application. In some embodiments, data storage 154 can additionally include storage required to perform at least part of the herein-described methods and techniques and/or at least part of the functionality of the herein-described devices and networks.

Cloud-Based Servers

FIG. 1D depicts a network 126 of computing clusters 159a, 159b, 159c arranged as a cloud-based server system in accordance with an example embodiment. Server devices 128 and/or 130 can be cloud-based devices that store program logic and/or data of cloud-based applications and/or services. In some embodiments, server devices 128 and/or 130 can be a single computing device residing in a single computing center. In other embodiments, server device 128 and/or 130 can include multiple computing devices in a single computing center, or even multiple computing devices located in multiple computing centers located in diverse geographic locations. For example, FIG. 1B depicts each of server devices 128 and 130 residing in different physical locations.

In some embodiments, data and services at server devices 128 and/or 130 can be encoded as computer readable information stored in tangible computer readable media (or computer readable storage media) and accessible by programmable devices 124a, 124b, and 124c, and/or other computing devices. In some embodiments, data at server device 128 and/or 130 can be stored on a single disk drive or other tangible storage media, or can be implemented on multiple disk drives or other tangible storage media located at one or more diverse geographic locations.

In FIG. 1D, the functions of server device 128 and/or 130 can be distributed among three computing clusters 159a, 159b, and 158c. Computing cluster 159a can include one or more computing devices 150a, cluster storage arrays 160a, and cluster routers 161a connected by a local cluster network 162a. Similarly, computing cluster 159b can include one or more computing devices 150b, cluster storage arrays 160b, and cluster routers 161b connected by a local cluster network 162b. Likewise, computing cluster 159c can include one or more computing devices 150c, cluster storage arrays 160c, and cluster routers 161c connected by a local cluster network 162c.

In some embodiments, each of the computing clusters 159a, 159b, and 159c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 159a, for example, computing devices 150a can be configured to perform various computing tasks of server 130. In one embodiment, the various functionalities of server 130 can be distributed among one or more of computing devices 150a, 150b, and 150c. Computing devices 150b and 150c in computing clusters 159b and 159c can be configured similarly to computing devices 150a in computing cluster 159a. On the other hand, in some embodiments, computing devices 150a, 150b, and 150c can be configured to perform different functions.

In some embodiments, computing tasks and stored data associated with server devices 128 and/or 130 can be distributed across computing devices 150a, 150b, and 150c based at least in part on the processing requirements of server devices 128 and/or 130, the processing capabilities of computing devices 150a, 150b, and 150c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 160a, 160b, and 160c of the computing clusters 159a, 159b, and 159c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 128 and/or 130 can be distributed across computing devices 150a, 150b, and 150c of computing clusters 159a, 159b, and 159c, various active portions and/or backup portions of these components can be distributed across cluster storage arrays 160a, 160b, and 160c. For example, some cluster storage arrays can be configured to store the data of server device 128, while other cluster storage arrays can store data of server device 130. Additionally, some cluster storage arrays can be configured to store backup versions of data stored in other cluster storage arrays.

The cluster routers 161a, 161b, and 161c in computing clusters 159a, 159b, and 159c can include networking equipment configured to provide internal and external communications for the computing clusters. For example, the cluster routers 161a in computing cluster 159a can include one or more internet switching and routing devices configured to provide (i) local area network communications between the computing devices 150a and the cluster storage arrays 160a via the local cluster network 162a, and (ii) wide area network communications between the computing cluster 159a and the computing clusters 159b and 159c via the wide area network connection 163a to network 126. Cluster routers 161b and 161c can include network equipment similar to the cluster routers 161a, and cluster routers 161b and 161c can perform similar networking functions for computing clusters 159b and 159b that cluster routers 161a perform for computing cluster 159a.

In some embodiments, the configuration of the cluster routers 161a, 161b, and 161c can be based at least in part on the data communication requirements of the computing devices and cluster storage arrays, the data communications capabilities of the network equipment in the cluster routers 161a, 161b, and 161c, the latency and throughput of local networks 162a, 162b, 162c, the latency, throughput, and cost of wide area network links 163a, 163b, and 163c, and/or other factors that can contribute to the cost, speed, fault-tolerance, resiliency, efficiency and/or other design goals of the moderation system architecture.

3. A Mobile Device for Use in 3D Model Creation and Search

Figure 2A:
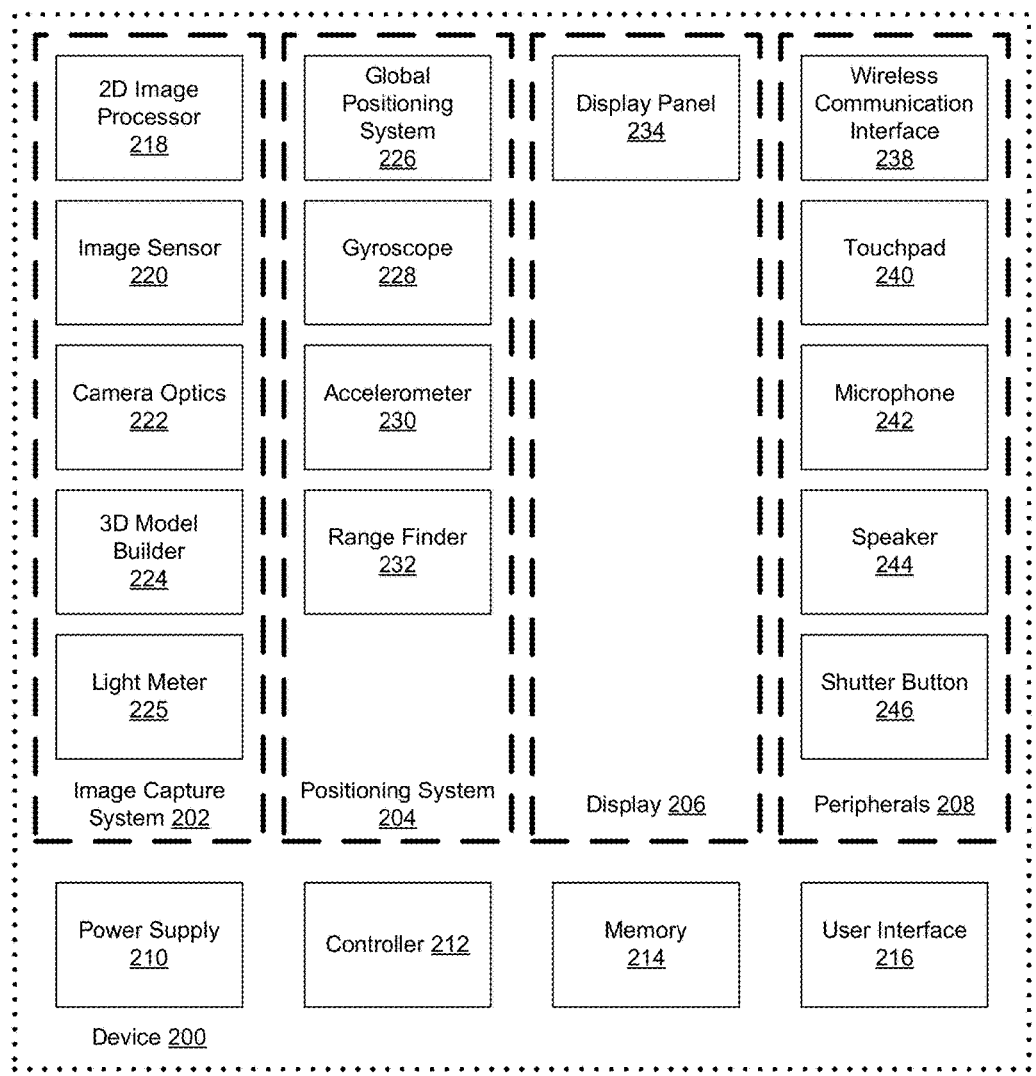
FIG. 2A is a functional block diagram of a mobile device, in accordance with an example embodiment.

FIG. 2A illustrates a functional block diagram of a device 200 that could be used to acquire a plurality of images of a target object, determine a 3D model of the target object based on the images, transmit a search query based on the determination, and receive a search query result as described in the present disclosure.

In an example embodiment, device 200 could include subsystems such as an image capture system 202, a positioning system 204, display 206, and peripherals 208, as well as a power supply 210, a controller 212, a memory 214, and a user interface 216.

The image capture system 202 may include components such as a 2-D image processor 218, an image sensor 220, camera optics 222, a 3D model builder 224, and a light meter 225. The positioning system 204 may include components such as a global positioning system (GPS) transceiver 226, a gyroscope 228, an accelerometer 230, and a range finder 232. The display 206 could include a display panel 234 and the peripherals 208 could include a wireless communication interface 238, a touchpad 240, a microphone 242, a speaker 244, and a shutter button 246.

Device 200 could represent a still camera, a video camera, a cell phone, a web cam, a tablet device, or any other image capture device known in the art. Further, device 200 could be part of a wearable computing system and/or integrated into any number of computing devices known in the art.

Device 200 could be used in 3D machine vision. For example, various embodiments of device 200 could be implemented with a robotic control system or in an autonomous vehicle to acquire images of a target object, determine a 3D model and transmit a search query from the device 200.

The power supply 210 may provide power to various components of device 200 and could represent, for example, a rechargeable lithium-ion battery. Other power supply materials and types known in the art are possible.

Many of the functions of device 200 could be controlled by controller 212. Controller 212 may include one or more processors (such as microprocessors) that execute instructions stored in a non-transitory computer readable medium, such as the memory 214. Controller 212 could control the user interface 216 to view 3D models displayed on the display panel 234. The controller 212 could also control the image capture system 202 and various other components of device 200. The controller 212 may also represent a plurality of computing devices that may serve to control individual components or subsystems of the device 200 in a distributed fashion.

In addition to instructions, the memory 214 may store data such as previously captured 2D images and 3D models. Thus, the memory 214 may function as a data store of information related to 3D object models. Such information may be used by device 200 and controller 212 at various points during the image acquisition and 3D model building process.

The device 200 may include a user interface 216 for providing information to or receiving input from a user of device 200. The user interface 216 could control or enable control of content and/or the layout of interactive images that could be displayed on display panel 234. Further, the user interface 216 could include one or more input/output devices within the set of peripherals 208, such as touchpad 240, microphone 242, and speaker 244. The controller 212 may control the function of the device 200 based on inputs received through the user interface 216. For example, the controller 212 may utilize user input from the user interface 216 to control when the image capture system 202 should begin acquiring a plurality of images of a target object.

The image capture system 202 could include several components similar to those that may be found in a digital camera. Specifically, the image capture system 202 may include various camera optics 222 configured to provide a field of view to the image sensor 220. The image capture system 202 could also include various other processors configured at least to manipulate image data to create 2D image files and also form 3D models from the 2D image files. These processors could include the 2D image processor 218 and the 3D model builder 224. The image capture system 202 could further include the light meter 225, which could be configured to provide ambient light measurements to controller 212. The ambient light measurements could be used to set exposure parameters that may include ISO, shutter speed and aperture settings for use when capturing the plurality of images of the target object. Further, the user interface 216 could act responsively to ambient light measurements. For example, the user interface 216 could request, provide instructions for, or otherwise alert the user to hold the camera steady during image capture if the ambient light level is determined to be low.

The positioning system 204 could be configured to provide data related to the current position and the current orientation of the device 200 to the controller 212.

The global positioning system (GPS) transceiver 226 could be a receiver that obtains clock and other signals from GPS satellites and may be configured to provide real-time location information to the controller 212. The gyroscope 228 could be a microelectromechanical system (MEMS) gyroscope, a fiber optic gyroscope, or another type of gyroscope known in the art. The gyroscope 228 may be configured to provide orientation information to the controller 212. The positioning system 204 could further include an accelerometer 230 configured to provide motion input data to the controller 212. The accelerometer 230 could be one or any combination of known accelerometer types known in the art such as piezoelectric, optical, resistive, capacitive, shear mode, strain gauge, surface acoustic wave, laser, MEMS, etc.

A range finder 232 could be included in the positioning system 204. In some example embodiments, the range finder 232 could be used to determine the distance to a target object. In such embodiments, the distance information could be used to determine proper focus for the camera optics 222. For instance, the range finder 232 could generate a rough depth map of a scene using, for instance, an ultrasonic or infrared illuminator and detector. The rough depth map could be used in conjunction with the plurality of acquired images to determine the 3D model of the target object. The range finder 232 could include any known means for range-finding, such as LIDAR, RADAR, a microwave rangefinder, etc.

The display 206 could include a display panel 234. The display 206 could be configured to provide a variety of graphics to a user of device 200. For instance, the display 206 could function as a part of user interface 216 to display images, text, menus, and instructions to the user.

The device 200 may include a set of peripherals 208 that could be configured to provide input and output to and from a user of device 200. In one example, the device 200 may include a wireless communication interface 238 for wirelessly communicating with one or more devices directly or via a communication network. For example, wireless communication interface 238 could use 3G cellular communication, such as CDMA, EVDO, GSM/GPRS, or 4G cellular communication, such as WiMAX or LTE. Alternatively, wireless communication interface 238 could communicate with a wireless local area network (WLAN), for example, using WiFi. In some embodiments, wireless communication interface 238 could communicate directly with a device, for example, using an infrared link, Bluetooth, or ZigBee.

The shutter button 246 could be used by a user of the device 200 to manually capture an initial image. Alternatively, the shutter button 246 could be depressed by mechanical means. In some embodiments, the device 200 may not have a shutter button 246. For instance, the capture of images could be fully automated or initiated in another way, for example in response to a voice command via the microphone 242, a touch input using the touchpad 240, or a remote device communicating with the device 200 via the wireless communication interface 238.

The components of the device 200 may be configured to work in an interconnected fashion with other components within or outside their respective systems. For instance, in an example embodiment, a user of the device 200 may press the shutter button 246 while the device 200 is in a 3D object modeling mode. In response to the user input, the range finder 232 could determine the range to a relevant target object within the field of view of the camera optics 222. The camera optics 222 could autofocus on the target object. The light meter 225 may be controlled by the controller 212 to set the correct exposure based at least on ambient lighting conditions and various characteristics of the camera optics 222 and the image sensor 220, such as aperture and ISO settings. In response to setting the correct exposure, the image sensor 220 may be controlled by the controller 212 to capture an initial image. The raw data from the image sensor 220 may be transmitted to the 2D image processor 218 in order to convert the raw image file to a compressed image format, such as the Joint Photographic Experts Group (JPEG) standard file format. The initial image JPEG may be transmitted to the display panel 234 for image preview/display.

Although FIG. 2A shows various components of device 200, i.e., wireless communication interface 238, controller 212, memory 214, image sensor 220, GPS transceiver 226, and user interface 216, as being integrated into the device 200, one or more of these components could be mounted or associated separately from the device 200. For example, image sensor 220 could be mounted separately from the device 200. Thus, the device 200 could be provided in the form of device elements that may be located separately or together. The device elements that make up device 200 could be communicatively coupled together in either a wired or wireless fashion.

Figure 2B:
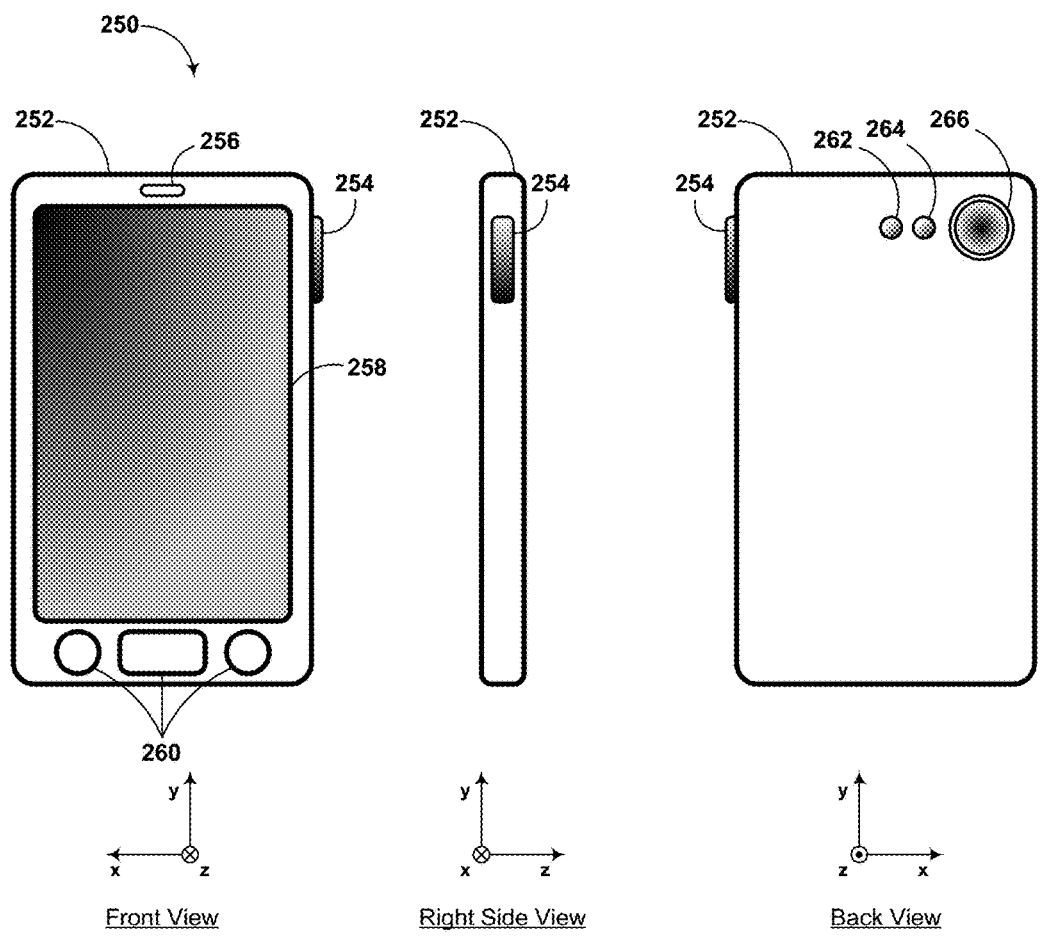
FIG. 2B shows front, side, and back views of a mobile device, in accordance with an example embodiment.

FIG. 2B illustrates a mobile device 250 could include various elements, such as a body 252, a shutter button 254, a speaker/microphone 256, a display 258, and other buttons 260. The elements of mobile device 250 could include some or all of the elements described for FIG. 2A. Mobile device 250 could further include a range finder 262, a light source 264 and a camera 266. Although mobile device 250 is depicted in FIG. 2B as a phone, other embodiments are possible. For instance, the mobile device 250 could be a tablet computer, wearable computer, or a laptop computer, among other examples.

In the example embodiment, the range finder 262 could be an ultrasonic rangefinder or infrared rangefinder, but other types of rangefinders known in the art are possible.

The light source 264 could represent an infrared light-emitting diode (LED) to assist with autofocus. Alternatively or additionally, the light source 264 could serve to provide direct lighting during image capture with camera 266. For instance, the light source 264 could provide flash or constant illumination of the scene. The light source 264 could also be configured to provide structured light. Structured light could be used, for instance, to illuminate a target object while a plurality images are acquired of the target object. The presence of structured light in the images may be utilized in the determination of a 3D model of the target object.

In one embodiment, the camera 266 could include an image sensor and associated optical elements such as lenses. The camera 266 could offer zoom capabilities or could have a fixed focal length lens. In other embodiments, interchangeable lenses could be used with camera 266.

The camera 266 could have a variable mechanical aperture and a mechanical shutter. The camera 266 could include an electronic shutter. The camera 266 could be configured to capture still images, video images, or both. Further, camera 266 could represent a monoscopic, stereoscopic, or multiscopic camera.

The mobile device 250 could be configured to use the camera 266 to capture images of a target object. The images could be a plurality of still images or a video stream. The image capture could be triggered by pressing the shutter button 254, pressing a softkey, or by some other triggering means. Depending upon the exact embodiment, the images could be acquired automatically at a specific time interval, upon pressing shutter button 254, upon moving the mobile device 250 a predetermined distance, or according to a different predetermined acquisition schedule.

A controller, such as the controller 212 of FIG. 2A, could be used to determine a 3D model of the target object based on the acquired images. The 3D model could include three-dimensional shape and color information about the target object. The 3D model could also include other forms of information regarding the target object, including reflectance and luminance information about the target object. The 3D model could include a point cloud model and/or a wireframe model of the target object. The 3D model could be determined using several methods known in the art of computer vision and 3D imaging, including structure from motion (SFM) and stereoscopy/multiscopy techniques.

The controller of mobile device 250 could be further configured to transmit a search query that includes the 3D model. The search query could be a request for further general information about the target object. Alternatively, the search query could be a specific request for information about the target object such as the part and model numbers of the target object. Specific requests for other types of information regarding the target object are possible. The search query could be transmitted via any type of wired or wireless communication interface (e.g., such as wireless communication interface 238) or any other means for data transfer.

The controller of mobile device 250 could additionally be configured to receive a search query request. The search query request could be received via any type of wired or wireless communications link or another means for data transfer. The search query request may include, for instance, information regarding the target object, information regarding objects similar to the target object, and/or a suggestion to acquire additional images of the target object.

The display 258 could be configured to show a rendered representation of the 3D model. The rendered representation could be shown on the display 258 during and/or after image acquisition of the target object. The rendered representation could be generated by the mobile device 250 using known 3D rendering techniques and the 3D model of the target object. The display 258 could be configured to show rendered representations that include monoscopic, stereoscopic, or multiscopic images of the target object.

The display 258 could also be configured to show messages based on the search query result. For instance, if the search query result included a suggestion to acquire additional images of the right side of the target object, the display 258 could show, "Move the mobile device around the target object to the right." Additionally or alternatively, an arrow could be shown on the display 258 to direct the user of the mobile device to move it in a specific direction with respect to the target object.

Figure 3:
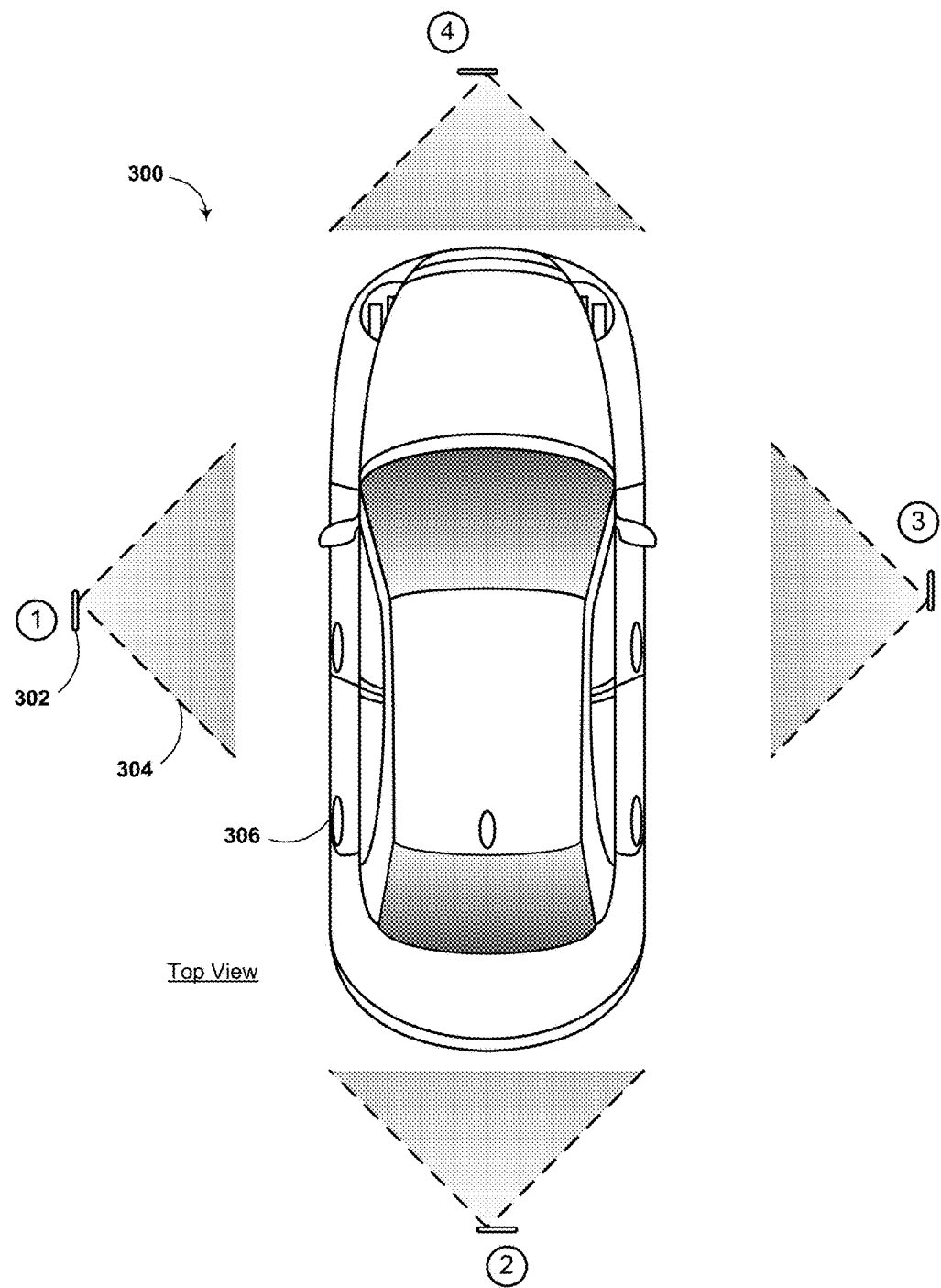
FIG. 3 illustrates a scenario for using a mobile device to capture images of a target object, in accordance with an example embodiment.

FIG. 3 illustrates a top view of an image acquisition situation 300. The figure includes a mobile device 302 that may be similar to the mobile device 250 from FIG. 2A. Mobile device 302 could include a camera with a field of view 304. The mobile device 302 could be in the local environment of a car 306, which may be considered a target object. Images could be acquired from four different viewing perspectives (viewing perspectives 1 through 4). Thus, the images may include information about the target object.

A controller 212 of the mobile device 302 may be configured to determine a 3D model of the car based on the acquired images. Also, the controller 212 may be configured to transmit a search query that includes the 3D model. Further, the controller 212 could be configured to receive a search query result.

Figure 4:
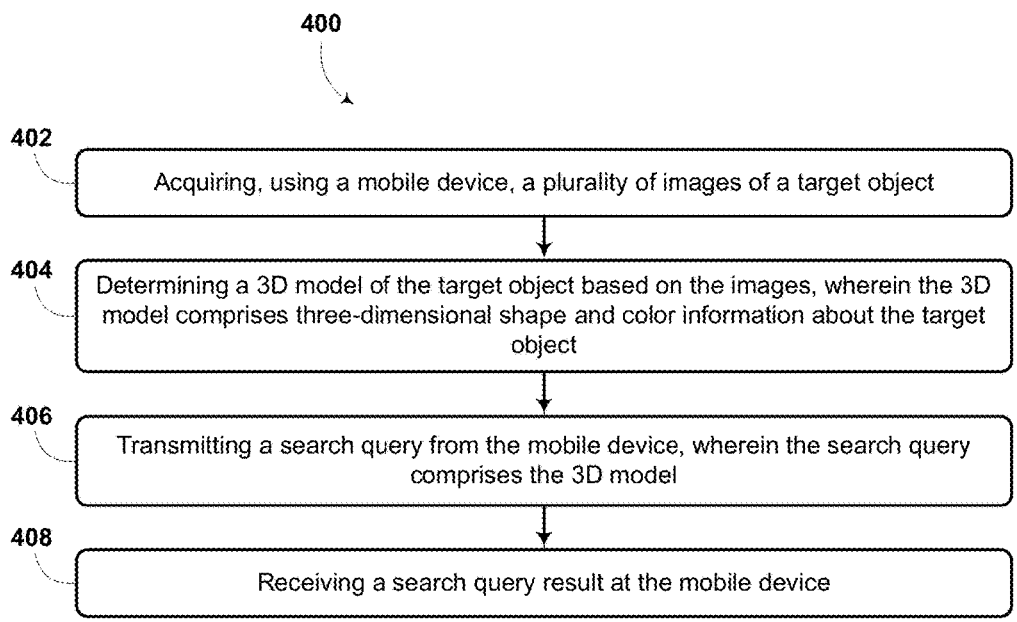
FIG. 4 is a flowchart of a method, in accordance with an example embodiment.

4. A Method for Using a Mobile Device to Determine 3D Models of Target Objects and Conduct Search Queries Based on Said 3D Models A method 400 is provided for using a mobile device to acquire a plurality of images of a target object, determining a 3D model from the images, generating a search query based on the 3D model, and transmitting the search query. The method could be performed using any of the apparatus shown in FIGS. 2-3 and described above, however, other configurations could be used. FIG. 4 illustrates the steps in an example method, however, it is understood that in other embodiments, the steps may appear in different order and steps could be added or subtracted.

Step 402 includes acquiring, using a mobile device, a plurality of images of a target object. In reference to FIGS. 2 and 3, the target object could be any object within the field of view of the camera 266 of the mobile device 250. Step 402 could be triggered by a user interaction with the graphical user interface of the mobile device 250 or by pressing shutter button 254. Alternatively, the step 402 could be triggered automatically or by some other means.

Step 402 could also be illustrated as shown in FIG. 3. In an example embodiment, a mobile device 302 with a camera field of view 304 may be in the local environment of a car 306, which may be termed the target object. In response to a user selecting a 3D model mode or another trigger, such as actuation of a shutter button or selection of a softkey, the mobile device 302 may begin acquiring images of the target object. The image acquisition could be carried out based on a specific schedule, a specific time interval, a specific position/orientation of the camera, among other triggers.

The plurality of images could be obtained using a monocular, stereoscopic, or multiscopic camera. Further, the images could be acquired using at least one active range sensor. A light source on the mobile device could be used to illuminate the target object. The light source could be a visible or infrared LED, for example. Infrared laser diodes may further be used as a light source. Furthermore, the light source could be configured to provide structured light to illuminate the target object.

In the example embodiment, images of the car 306 could be acquired from several different viewing perspectives (viewing perspectives 1 through 4). Acquiring images from each of the four different viewing perspectives may provide information about each side of the car. These images could provide sufficient data for a 3D model of the car to be determined.

Step 404 includes determining a 3D model of the target object based on the images. The 3D model could include three-dimensional shape and color information about the target object. Further, the 3D model could include information about the luminance and reflectivity and general lighting information about the target object. Other information about the target object could also be included in the 3D model. Step 404 could be carried out continuously as the mobile device is acquiring images of the target object. For instance, the mobile device 200 could be adding point cloud and color information to the 3D model while new images are being acquired of the target image.

While determination of the 3D model is being performed, or at any other time afterward, the disclosed method could include displaying a rendered representation of the 3D model on the mobile device. For instance, during the acquisition of the plurality of images, a display on the mobile device may show a rendered representation of the 3D model of the target object.

In some examples, the mobile device may be configured to determine the 3D model of the target object based on the images acquired by the mobile device. In other examples, the mobile device may provide the images and/or other information related to the target object to a server, and the server may be configured to determine the 3D model of the target object. In still other examples, the 3D model may be generated partially at the mobile device and the server may be configured to use the partially generated 3D model and the images to complete generation or determination of the 3D model. In the examples where the 3D model is determined by the server, the server may be configured to provide information relating to the 3D model to the mobile device.

Step 406 includes transmitting a search query from the mobile device based at least in part on the 3D model. The search query could include just the 3D model and/or information related to the 3D model. Alternatively, the search query could include other search criteria. For instance, a user could request pricing information regarding a target object. Accordingly, the search query could include the 3D model as well as a specific request for item pricing. The search query could also include one or more of the images that the mobile device acquired of the target object. Other examples of specific search queries are possible.

Step 406 could occur once a predetermined amount of information regarding the target object has been incorporated into the 3D model. For instance, once at least a rough point cloud 'shell' has been determined from the images, a search query could be transmitted. Alternatively, search queries could be transmitted on periodic basis once image acquisition of the target object begins. Thus, search queries could include partial 3D model information about a target object. Such partial 3D model search queries may be sufficient to enable useful search query results from the server.

Step 408 includes receiving a search query result at the mobile device. The search query result could be a response from a server. In some examples, the server may receive a search query including the 3D model and other information related to the object from the mobile device to perform a search. In other examples where the server determines the 3D model, the search query may include other information that is used by the server along with the 3D model determined by the server to perform the search. The search query result could include, depending upon the circumstances, i) information regarding the target object (e.g., pricing, location, size, and model number of the target object, etc.); ii) information regarding objects similar to the target object; and/or iii) a suggestion to acquire further images of the target object. The step 408 could be performed on a continuous basis depending on the frequency of the transmitted search query results. Thus, a user may be notified via his/her mobile device that further images need to be acquired. Other feedback types via search query results are possible.

In one example of step 408, further 3D model data may be needed to disambiguate car 306 from other cars in a shape-search database. For instance, with respect to the acquired images of the car 306, the top of the 3D model of the car 306 could be incomplete. A search query result may be received to suggest further image acquisition from a particular viewpoint of the target object. In response, the mobile device may provide feedback to a user of the mobile device to move it so further images could be acquired in order to fill in the missing 3D model data. For instance, the mobile device could receive a suggestion to acquire more images of the top side of the car 306 and the mobile device may acquire images of the top side of the target object. Subsequently, new data could be added to the 3D model and a new search query or search queries could be transmitted in order to obtain a more substantive search query result.

Other search query result types are possible. For instance, the search query result could include information about the target object. From the above example, a car manufacturer, car model, and purchase locations could be included in the search query result. Further, information about objects similar to the target object could be included in the search query result. For instance, the search query result may include information about cars with four doors and a similar body style to the target object.

Example methods, such as method 400 of FIG. 4, may be carried out in whole or in part by the mobile device. Accordingly, example methods could be described by way of example herein as being implemented by the mobile device. However, it should be understood that an example method may be implemented in whole or in part by other computing devices. For example, an example method may be implemented in whole or in part by a server system, which receives data from a device such as the mobile device. As additional examples, an example method may be implemented in whole or in part by computing devices such as a mobile phone, a tablet computer, and/or a laptop or desktop computer. Other examples of computing devices or combinations of computing devices that can implement an example method are possible.

Those skilled in the art will understand that many variations to the method illustrated in FIG. 4 and described above are possible. Those variations are implicitly contemplated herein. In one possible variation, the 3D model in the search query might not include all of the information described above. For instance, the 3D model might include three-dimensional shape information but not color information. In another possible variation, the search query might not include a 3D model at all. Instead, the search query could include the images that the mobile device acquired of the target object. The server could then generate the 3D model of the target object based on the images in the search query. In that case, the search query result could include the 3D model that the server generated. Still other variations are possible as well.

Figure 5:
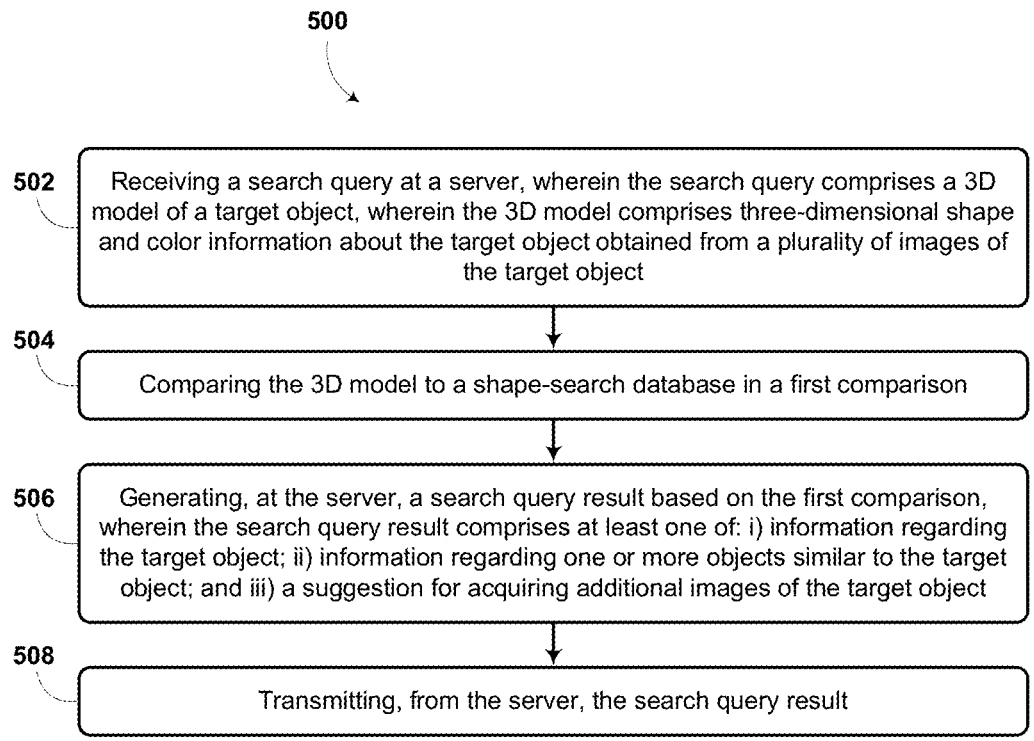
FIG. 5 is a flowchart of a method, in accordance with an example embodiment.

5. A Method Using a Server to Compare a 3D Model and a Shape-Search Database and Based on the Comparison, Generate and Transmit a Search Query Result A method 500 is provided for using a server to receive a search query with a 3D model, comparing the 3D model to a shape-search database, generating a search query result based on the comparison, and transmitting the search query result. The method could be performed using any of the apparatus shown in FIG. 1A-D and described herein, however, other configurations could be used. FIG. 5 illustrates the steps in an example method, however, it is understood that in other embodiments, the steps may appear in different order and steps could be added or subtracted.

Step 502 includes receiving a search query. The search query includes a 3D model of a target object. The 3D model includes three-dimensional shape and color information about the target object obtained from a plurality of images of the target object. The 3D model could include other information about the target object including luminance, reflectivity, and other lighting information. The search query could be received via any wired or wireless communication means or another data transfer method. In an example embodiment, the search query is received from a mobile device.

Step 504 includes comparing the 3D model to a shape-search database in a first comparison. The shape-search database could include information on objects, surfaces, locations, lighting conditions, among other possibilities. Additionally, the shape-search database could serve as a shape reference library for a comparison with the 3D model. For example, upon receiving a search query and associated 3D model, the 3D model could be compared to the shape-search database in order to obtain information about the 3D model.

Step 506 includes, based on the information obtained about the 3D model, generating a search query result. The search query result could include information such as objects in the shape-search database that are similar in any combination of shape, texture, color, size, bound volume, luminance, reflectance, lighting quality, and/or any other indexed object attribute.

The search query result could include specific information about the object, such as a description, a model number, a manufacturer. An object's size, weight, color, and/or other characteristics could be conveyed in the search query result. Further, the search query result may include price information and possible purchasing locations. Other types of information related to the 3D model and its shape could be included in the search query result.

The search query result may additionally or alternatively include information regarding one or more objects similar to the target object. For instance, if a search query is received that includes a 3D model of a high-backed chair, a search query result could be generated that contains similar objects in various related categories such as: swiveling high back chairs, fixed-leg high back chairs, and high back bar stools. In this example, the search query result could be configured to present these general categories to a user of the mobile device. Such similar objects could be expressed in terms of their generic categories (e.g., objects could be displayed to the user in silhouette) such that a user could relay basic disambiguation information back to the server.

The search query result may also include other information that could be used to form a more complete 3D model of a target object. In one embodiment, a search query result may include a suggestion for a user to obtain more images of a target object. Alternatively, the search query result could act as an automatic trigger for a mobile device to capture more images of the target object without interaction by a user of the mobile device. Other types of search query results are possible within the context of the present disclosure.

Step 508 includes transmitting, from the server, the search query result. The search query result could be transmitted back to the source of the original search query. Alternatively or additionally, the search query result could be transmitted to another device or server, for instance, to aggregate search results to optimize shape-search efficiency.

Based on the first comparison, a heat map could be generated. The heat map could indicate regions of the 3D model that have greater or lesser similarity to the shape-search database. The heat map could be transmitted in the search query result and/or used in the comparison process.

In some embodiments, the method could be carried out in a 'coarse' phase and a 'refined' phase. The coarse phase could be used as a filter to select a subset of the information in the shape-search database for more refined searching in the refined phase. For instance, the coarse phase could be used to determine a general classification of the target object, and the refined phase could be used to search through the shape-search database based on the general classification to identify the target object more specifically. As one specific example of this approach, suppose the target object is a particular model of office chair. The coarse search might be used to determine that the target object is some type of chair, rather than say an automobile or a dog. The refined search might then search through the information in the shape-search database relating to chairs to identify the particular model of office chair.

The coarse phase may involve searching the shape-search database using a coarse 3D model. The coarse 3D model could be any 3D model that is able to select a subset of the information in the shape-search database for more refined searching in the refined phase. In some examples, the coarse 3D model could be a decimated or low-resolution model with a relatively coarse mesh (i.e., a relatively large distance between mesh points or point cloud data). In other examples, the coarse 3D model could include a relatively large number of flaws, errors, or artifacts, a relatively large amount of noise, and/or incomplete model data. In general, the coarse 3D model could be a relatively crude model in comparison to the refined model used in the refined phase. Nonetheless, the coarse 3D model may be sufficient to determine a general classification of a target object so as to narrow the scope of the search that is conducted in the refined phrase.

If a coarse match exists, a refined model could be determined for the refined phase. The coarse match could indicate that the coarse 3D model corresponds to a general classification or type of object existing in the shape-search database. The refined model could be any model that can be used to search through the objects of that general classification or type in the shape-search database to obtain a more specific match. In some embodiments, the refined model could be a 2D model, such as a 2D model based on a 2D image that was included in the search query or subsequently provided. In such embodiments, the refined phase could be conducted using 2D matching techniques. In other embodiments, the refined model could be a 3D model, in which case the refined phase could be conducted using 3D model matching techniques.

A refined 3D model could be created by adding information (e.g., texture, color, and/or shape information) to the coarse 3D model based on one or more objects in the shape-search database corresponding to the coarse match. A second comparison could then be conducted to determine a refined match. If a refined match exists, a search query result could be transmitted.

Additionally, if a coarse match is found to exist, additional images could be required in order to determine a refined match. Thus, a suggestion to acquire further images of the target object could be included in the search query result.

Using an earlier example, a plurality of images of a car could be acquired in an effort to determine a 3D model of the car. A coarse 3D model based on the images could be received in a search query by the server. A first comparison could be made between the coarse 3D model and the shape-search database. The result of the first comparison could be a coarse match. In response, the server could, in a search query result, suggest the acquisition of further images. For instance, a user of a mobile device could be requested to acquire more images of the car from above to more fully complete the 3D model.

Further, the search query result could include information about similar cars, possibly attained from the coarse match. For instance, four-door sedans of similar color, size, and/or shape could be included in the search query result.

Alternatively or additionally, the server could act to complete the coarse 3D model based on the shape-search database. For instance, texture and/or shape information from the comparison could be added to the coarse 3D model of the car to form a refined 3D model that may include, for instance, more complete information about the car's roof and undercarriage.

The refined 3D model of the car could be used in a second comparison in order to provide a search query result. The search query result could include more accurate information about the car make, model, performance characteristics, dealer locations, etc.

Heat maps could be generated as a result of the first and second comparison so as to graphically display differences between a coarse and/or refined 3D model and a respective model from the shape-search database. Heat maps could be utilized in order to determine a coarse and/or refined match in the first and second comparisons.

Those skilled in the art will understand that many variations to the method illustrated in FIG. 5 and described above are possible. Those variations are implicitly contemplated herein. In one possible variation, the 3D model in the search query might not include all of the information described above. For instance, the 3D model might include three-dimensional shape information but not color information. In another possible variation, the search query might not include a 3D model at all. Instead, the search query could include multiple images of the target object from different viewing perspectives. The server could then generate the 3D model of the target object based on the images in the search query. In that case, the search query result could include the 3D model that the server generated. Still other variations are possible as well.

Figure 6:
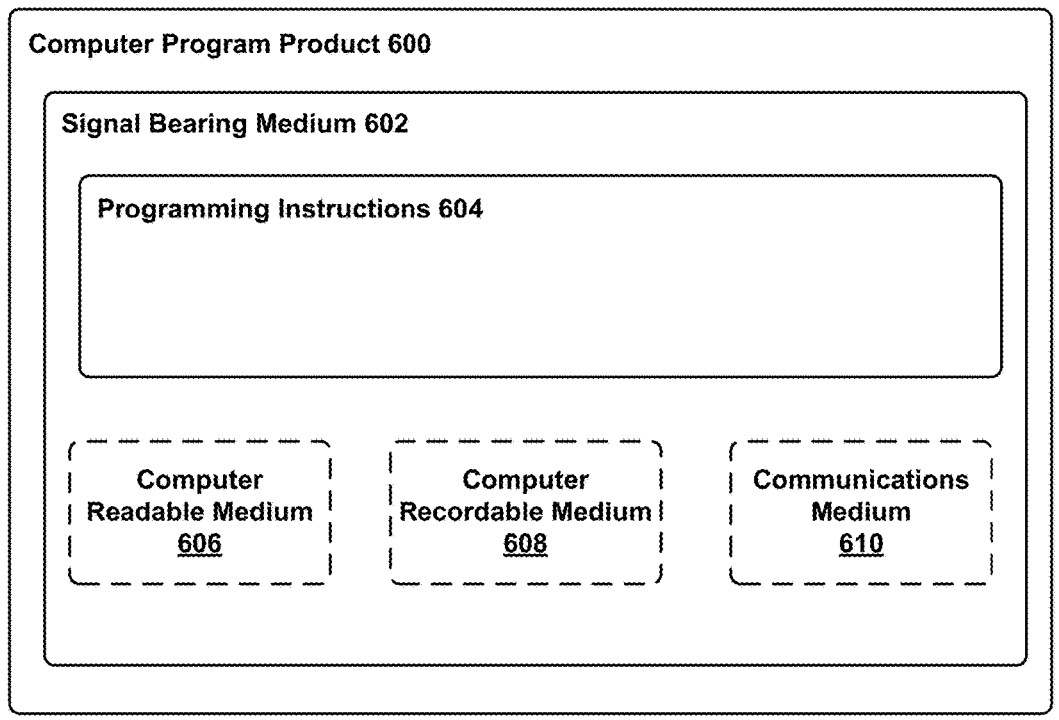
FIG. 6 is a schematic diagram of a computer program product, in accordance with an example embodiment.

6. A Non-Transitory Computer Readable Medium for 3D Model Creation and Search and a Non-Transitory Computer Readable Medium for 3D Model/Shape-Search Database Comparison and Search Query Result Creation/Transmission In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIG. 1A and FIGS. 2-5. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computing device 150 of FIG. 1C may be configured to provide various operations, functions, or actions in response to the programming instructions 604 conveyed to the computing device 150 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a mobile device, such as the device 200 illustrated in FIG. 2A. Alternatively, the computing device that executes some or all of the stored instructions could be another computing device, such as the server 104 illustrated in FIG. 1A.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
receiving a search query at a server device, wherein the search query comprises a coarse 3D model of a target object, wherein the coarse 3D model comprises three-dimensional shape and color information about the target object, and wherein the coarse 3D model is based on a plurality of images of the target object that were captured by a mobile device;
comparing the coarse 3D model to a shape-search database in a first comparison;
in response to the first comparison, (i) determining that a coarse match has been found between the coarse 3D model and an object type in the shape-search database, and (ii) requesting, by the server device, additional images of the target object from the mobile device, wherein the target object is of the object type;
receiving, by the server device, the additional images of the target object from the mobile device;
based on the coarse 3D model and the additional images of the target object received from the mobile device, generating a refined 3D model of the target object, wherein the refined 3D model contains more information related to the target object than the course 3D model;
comparing the refined 3D model to objects of the object type in the shape-search database in a second comparison; and
transmitting, by the server device to the mobile device, a search query result, wherein the search query result includes information regarding one or more of the objects of the object type from the shape-search database that are similar to the refined 3D model.

2. The method of claim 1, wherein generating the refined 3D model is also based on the shape-search database.

3. The method of claim 2, wherein generating the refined 3D model comprises adding to the refined 3D model based on the shape-search database.

4. The method of claim 2, wherein generating the refined 3D model comprises adding texture information to the refined 3D model based on the shape-search database.

5. The method of claim 1, wherein the information regarding one or more of the objects of the object type comprises a location associated with the target object.

6. The method of claim 1, wherein the coarse model also comprises luminance and reflectivity of the target object.

7. The method of claim 1, wherein the information regarding one or more of the objects of the object type includes a model number and a manufacturer.

8. The method of claim 1, wherein requesting the additional images of the target object comprises automatically triggering the mobile device to capture the additional images of the target object.

9. The method of claim 1, further comprising:
generating respective first and second heat maps in response to the first and second comparisons;
graphically displaying, with the first heat map, differences between the coarse 3D model and a first model from the shape-search database; and
graphically displaying, with the second heat map, differences between the refined 3D model and a second model from the shape-search database.

10. A server device comprising:
a processor;
a non-transitory computer readable medium;
instructions stored in the non-transitory computer readable medium, wherein the instructions are executable by the processor to cause the server to perform operations comprising:
receiving a search query at the server device, wherein the search query comprises a coarse 3D model of a target object, wherein the coarse 3D model comprises three-dimensional shape and color information about the target object, and wherein the coarse 3D model is based on a plurality of images of the target object that were captured by a mobile device;
comparing the coarse 3D model to a shape-search database in a first comparison;
in response to the first comparison, (i) determining that a coarse match has been found between the coarse 3D model and an object type in the shape-search database, and (ii) requesting, by the server device, additional images of the target object from the mobile device, wherein the target object is of the object type;
receiving the additional images of the target object from the mobile device;
based on the coarse 3D model and the additional images of the target object received from the mobile device, generating a refined 3D model of the target object wherein the refined 3D model contains more information related to the target object than the course 3D model;
comparing the refined 3D model to objects of the object type in the shape-search database in a second comparison; and
transmitting, by the server device to the mobile device, a search query result, wherein the search query result includes information regarding one or more of the objects of the object type from the shape-search database that are similar to the refined 3D model.

11. The server device of claim 10, wherein generating the refined 3D model is also based on the shape-search database.

12. The server device of claim 11, wherein generating the refined 3D model comprises adding to the refined 3D model based on the shape-search database.

13. The server device of claim 11, wherein generating the refined 3D model comprises adding texture information to the refined 3D model based on the shape-search database.

14. The server device of claim 10, wherein the coarse model also comprises luminance and reflectivity of the target object.

15. The server device of claim 10, wherein requesting the additional images of the target object comprises automatically triggering the mobile device to capture the additional images of the target object.

16. The server device of claim 10, the operations further comprising:
generating respective first and second heat maps in response to the first and second comparisons;
graphically displaying, with the first heat map, differences between the coarse 3D model and a first model from the shape-search database; and
graphically displaying, with the second heat map, differences between the refined 3D model and a second model from the shape-search database.

17. A non-transitory computer readable medium having stored therein instructions executable by a computing device to cause the computing device to perform operations, the operations comprising:
receiving a search query, wherein the search query comprises a coarse 3D model of a target object, wherein the coarse 3D model comprises three-dimensional shape and color information about the target object, and wherein the coarse 3D model is based on a plurality of images of the target object that were captured by a mobile device;
comparing the coarse 3D model to a shape-search database in a first comparison;
in response to the first comparison, (i) determining that a coarse match has been found between the coarse 3D model and an object type in the shape-search database, and (ii) requesting additional images of the target object from the mobile device, wherein the target object is of the object type;
receiving the additional images of the target object from the mobile device;
based on the coarse 3D model and the additional images of the target object received from the mobile device, generating a refined 3D model of the target object, wherein the refined 3D model contains more information related to the target object than the course 3D model;
comparing the refined 3D model to objects of the object type in the shape-search database in a second comparison; and
transmitting, to the mobile device, a search query result, wherein the search query result includes information regarding one or more of the objects of the object type from the shape-search database that are similar to the refined 3D model.

18. The non-transitory computer readable medium of claim 17, wherein the coarse model also comprises luminance and reflectivity of the target object.

19. The non-transitory computer readable medium of claim 17, wherein requesting the additional images of the target object comprises automatically triggering the mobile device to capture the additional images of the target object.

20. The non-transitory computer readable medium of claim 17, the operations further comprising:
generating respective first and second heat maps in response to the first and second comparisons;
graphically displaying, with the first heat map, differences between the coarse 3D model and a first model from the shape-search database; and
graphically displaying, with the second heat map, differences between the refined 3D model and a second model from the shape-search database.

* * * * *